(12) United States Patent
Cooper et al.

(10) Patent No.: US 9,746,067 B2
(45) Date of Patent: Aug. 29, 2017

(54) GEAR HAVING IMPROVED SURFACE FINISH

(75) Inventors: Clark V. Cooper, Arlington, VA (US);
Sonia Tulyani, Manchester, CT (US);
Edward J. Karedes, Chesire, CT (US);
Jefferi J. Covington, South Glastonbury, CT (US); Alexander Staroselsky, Avon, CT (US); Harsh Vinayak, Gurgeon (IN)

(73) Assignee: United Technologies Corporation, Hartford, CT (US)

( * ) Notice: Subject to any disclaimer, the term of this patent is extended or adjusted under 35 U.S.C. 154(b) by 1123 days.

(21) Appl. No.: 12/084,603

(22) PCT Filed: Dec. 2, 2005

(86) PCT No.: PCT/US2005/043734
§ 371 (c)(1),
(2), (4) Date: May 6, 2008

(87) PCT Pub. No.: WO2007/064330
PCT Pub. Date: Jun. 7, 2007

(65) Prior Publication Data
US 2009/0107275 A1  Apr. 30, 2009

(51) Int. Cl.
*F16H 55/08* (2006.01)
*F16H 57/04* (2010.01)
*F16H 55/06* (2006.01)

(52) U.S. Cl.
CPC ........... *F16H 57/041* (2013.01); *F16H 55/06* (2013.01); *Y10T 74/19972* (2015.01); *Y10T 74/19995* (2015.01)

(58) Field of Classification Search
USPC .......................................................... 74/462
See application file for complete search history.

(56) References Cited

U.S. PATENT DOCUMENTS 4,157,258 A * 6/1979 Philip et al. .................... 420/84
5,549,764 A * 8/1996 Biltgen et al. ................ 148/222
5,698,502 A * 12/1997 Pafford et al. ................ 508/485
(Continued)

FOREIGN PATENT DOCUMENTS

EP        1167825           1/2002
JP        2000257697 A *    9/2000    ............ C23C 14/06
(Continued)

OTHER PUBLICATIONS

Ehinger et al., "Evaluation of Isotropic Superfinishing on a Bell Helicopter Model 427 Main Rotor Gearbox", May 1-3, 2007, American Helicopter Society International, Inc.*
(Continued)

*Primary Examiner* — Terence Boes
(74) *Attorney, Agent, or Firm* — Carlson, Gaskey & Olds, P.C.

(57) ABSTRACT

There is a gear set. The gear set has a) a first gear having a first surface and b) an intermeshing second gear having a second surface. The first and second surfaces each, independently, have an isotropic arithmetic mean roughness, Ra, of about 0.0762 micrometers/3 microinches or less and are lubricated. There is also a method for increasing the contact surface-fatigue life of a gear set.

7 Claims, 2 Drawing Sheets

(56) References Cited

U.S. PATENT DOCUMENTS

| 6,732,606 B1* | 5/2004 | Zhu et al. ................. 74/460 |
|---|---|---|
| 2003/0171227 A1* | 9/2003 | Holt et al. ................. 508/438 |

FOREIGN PATENT DOCUMENTS

| WO | 02062528 | 8/2002 |
|---|---|---|
| WO | 2004108356 | 12/2004 |

OTHER PUBLICATIONS

Rao et al., "Repair of Helicopter Gears", Oct. 2005, American Gear Manufacturers Association.*
P. Niskanen et al.: "Reducing Wear with Superfinishing Technology," The AMPTIAC Quarterly, vol. 7, No. 1-2003, Seite 3-9.
G. Niemann, H. Winter; Maschinenelemente; Band II; "Getriebe allgemein, Zahnradgetriebe- Grundlagen Stirnradgetriebe"; Springer Verlag 1989; Deckblatt und Seiten 138-140.
J Arvin et al.; "The Effect of Chemically Accelerated Vibratory Finishing on Gear Metrology"; American Gear Manufacturers Association, Oct. 2002.
G. Sroka, L. Winkelmann; "Superfinishing Gears—The State of the Art"; Gear Technology Nov./Dec. 2003; Seiten 28-33.
T.L. Krantz: "Surface Fatigue Lives of Case-Carburized Gears with an Improved Surface Finish", NASA Center for Aerospace Information, Apr. 2000, NSAS/TM-200-210044.

* cited by examiner

GEAR HAVING IMPROVED SURFACE FINISH

STATEMENT OF GOVERNMENT INTEREST

The invention was made by or under contract with the National Institute of Standards and Technology (NIST) under contract number 70NANB0H3048.

BACKGROUND OF THE INVENTION

1. Field of the Invention

The present invention relates to a gear set. More particularly, the present invention relates to a gear set having an improved surface finish that enhances load-carrying capability, contact surface-fatigue life, wear resistance, and performance.

2. Description of the Related Art

A problem encountered with sets of two or more intermeshing gears and/or pinions is wear, and, ultimately, failure. The main failure modes for gears are pitting or micro-pitting, wear, and scuffing. When a gear and pinion interact, the teeth of one necessarily contact the teeth of the other. Without lubrication, the opposing teeth scratch against, scuff, wear down, pit, and/or crack each other. Lubrication postpones the onset of these effects. Thus, the better the lubrication, the longer the life of the gear.

U.S. Pat. No. 6,732,606 B1 discloses a lubricated gear set with a gear having a surface roughness of approximately 5 to 12 microinches arithmetic mean roughness (Ra). The gear set is disclosed as exhibiting improved contact fatigue life, wear resistance, and performance.

It would be desirable to have a gear set that exhibits enhanced load-carrying capability, contact surface-fatigue life, wear resistance, and performance.

SUMMARY OF THE INVENTION

According to the present invention, there is a gear set that exhibits enhanced load-carrying capability, contact surface-fatigue life, wear resistance, and performance.

Further according to the present invention, there is a gear set having a) a first gear having a first surface and b) an intermeshing second gear having a second surface. The first and second surfaces each, independently, have an arithmetic mean roughness of about 3 microinches or less and are lubricated.

Still further according to the present invention, there is a method for increasing the contact surface-fatigue life of a gear set wherein the gear set has a first gear having a lubricated first surface and an intermeshing second gear having a lubricated second surface. The method has the step of providing the first and second surfaces with an arithmetic mean roughness of about 3 microinches or less.

DETAILED DESCRIPTION OF THE INVENTION

Figure 1:
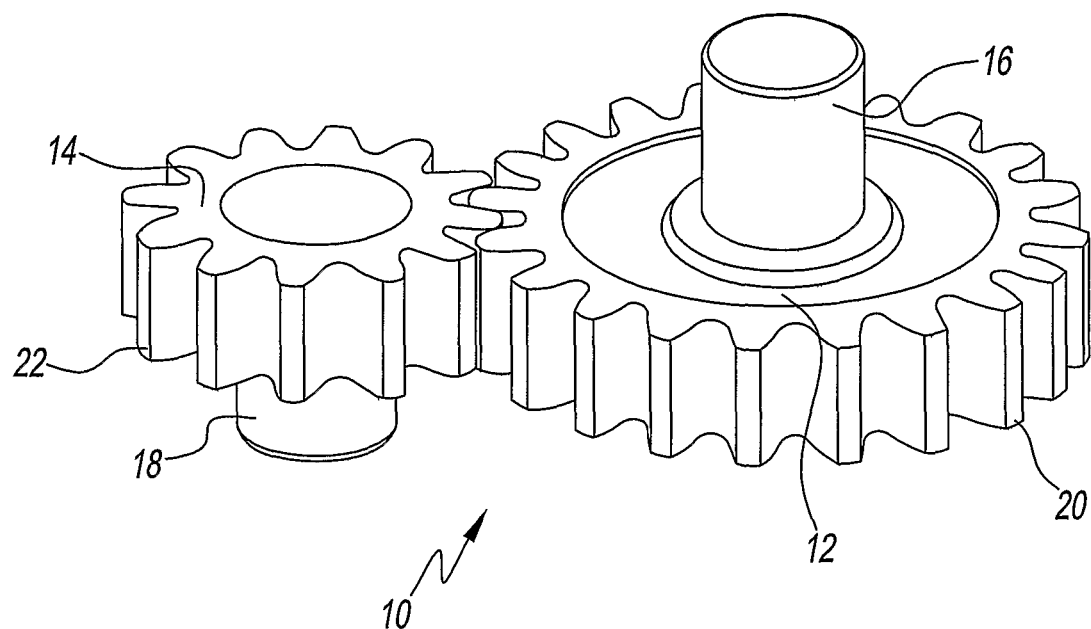
FIG. 1 is a perspective view of one embodiment of a spur gear set according to the present invention.

Gears and/or pinions (referred to interchangeably herein) useful in the present invention have surfaces having an isotropic (independent of direction of measurement) arithmetic mean roughness (Ra) of about 0.076 micrometers/3 microinches or less. Preferred surfaces have an Ra of about 0.00254 to about 0.076 micrometers (about 0.1 to about 3 microinches). Most preferred surfaces have an Ra of about 0.0254 to about 0.0508 micrometers (about 1 to about 2 microinches). Ra can be measured by any standard methods, e.g., stylus profilometry, non-contact surface reconstruction, and atomic-force microscopy.

The surfaces exhibiting the desired Ra will, at minimum, be those surfaces that contact opposing surfaces, e.g., the surfaces of the teeth of one gear contacting the surfaces of the teeth of another gear and/or pinion. When the gear set is of an embodiment that does not take the form of intermeshing teeth, e.g., a worm gear, the opposing surfaces that are in contact will exhibit the desired Ra.

The gear set is lubricated during operation. Any lubricant known in the art may be employed, such as natural or synthetic oils and greases. Gear surfaces are lubricated to a degree sufficient to prevent premature wear. Gear surfaces will receive a film lubricant layer that will vary depending on factors such as physical properties of the surface, surface texture and roughness, physical properties of the lubricant, and operating conditions (temperature, pressure, etc.). Gear surfaces in the present invention will typically have a lubricant film thickness of about 0.025 micrometers to about 1.27 micrometers (about 1 microinch to about 50 microinches) and more typically from about 0.0762 micrometers to about 0.762 micrometers (about 3 microinches to about 30 microinches). The lubricant film thickness that forms between the meshing gears is independent of the surface finish of the meshing gear components.

An advantage of the present invention is the relatively large lambda ($\lambda$) ratios afforded. The lambda ratio is the ratio of lubricant film thickness to the composite surface roughness. The relatively low surface roughness of the gear surfaces in the present invention have the effect of increasing the lambda ratio. As the lambda ratio increases, gear surface durability and wear resistance increase. Thus, surface life increases. Preferably, gear surfaces will have a lambda value of about 0.6 or more. More preferably, gear surfaces will have a lambda value of about 1.0 to about 2.0.

Superfinishing may be used to refine the surface roughness of various gears, thereby increasing the lambda ratio and the gear surface durability and load-carrying capability, without requiring any changes in lubricant viscosity, relative gear pitch-line velocity or temperature.

A semi-empirical model was used to determine the effect of surface roughness on friction coefficient. The model was designed to capture the effects of "as ground" gears with an average surface roughness of 0.508 micrometers/20 microinches Ra as well as "superfinished" gears with an average surface roughness of 0.0254 microinches/1 microinch Ra. A coarse grain potential molecular dynamics approach was used to model the interaction between the lubricant and substrate. The optimal gear surface finish, Ra, as estimated using this molecular dynamics modeling approach, was determined to be from about 0.0318 to about 0.0762 micrometers (about 1.25 to about 3.0 microinches) Ra.

Figure 2:
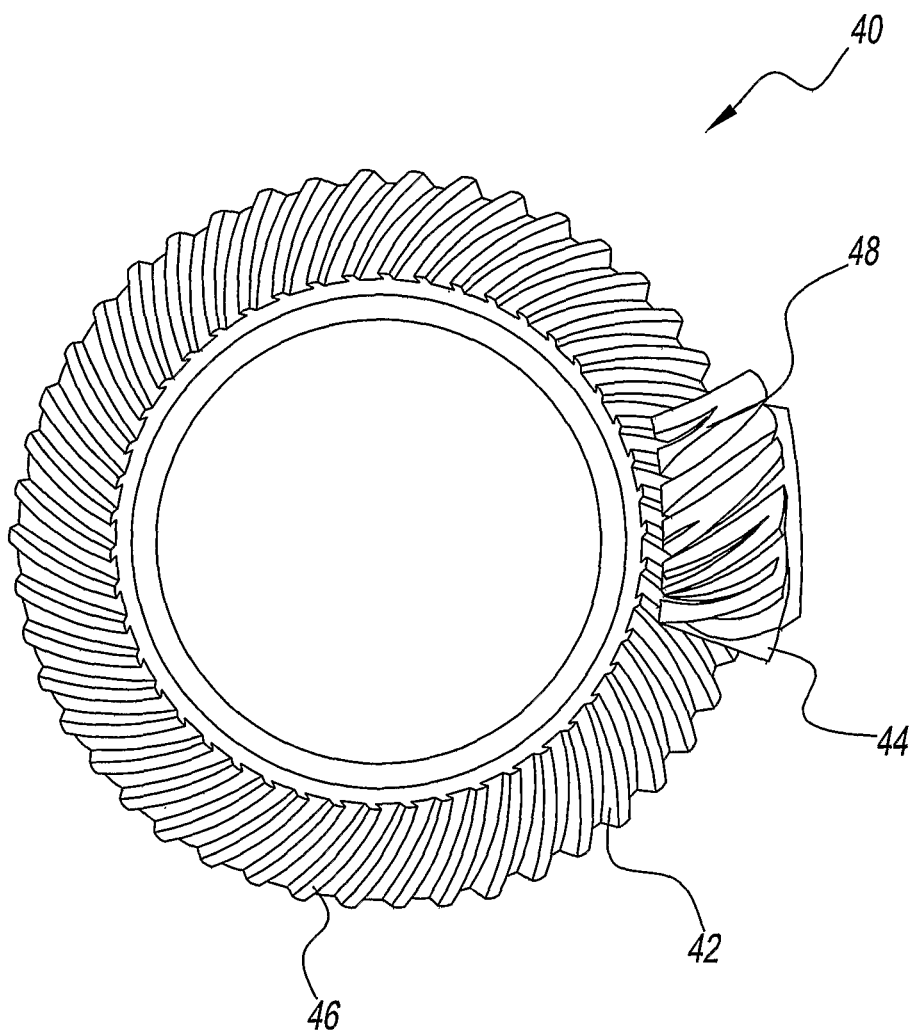
FIG. 2 is a top view of another embodiment of a spiral bevel gear set according to the present invention.

FIG. 1 illustrates a spur gear set 10. Spur gear set 10 has a gear 12 and a pinion 14. The pinion 14, by convention, is the smaller of the two gears. Spur gear set 10 is used to transmit motion and torque (power) between parallel shafts 16, 18. Gear 12 and pinion 14 have teeth 20 and 22, respectively, which are generally straight and radially disposed on the shafts. FIG. 2 illustrates a spiral bevel gear set 40. Spiral bevel gear set 40 has a gear 42 and a pinion 44 that have intersecting axes (not shown) and are used to transmit torque (power) through an angle change as well as to achieve a desired gear reduction or augmentation (overdrive) between intersecting shafts (not shown). Gear 42 and pinion 44 have teeth 46 and 48, respectively, which are generally beveled and helical. It is clear that these two examples merely illustrate non-limiting applications for the present invention and that a skilled artisan recognizes that other gear types are amenable to such processing to refine their surface finish for improved performance and durability.

Gears can be fabricated from any known rigid material. Most commonly, gears are fashioned from metals, such as but not limited to, cast iron, steel, aluminum, and brass. Gears may also be fabricated from rigid plastics, such as but not limited to, nylon, vinyl chloride, polypropylene, and high-density polyethylene.

Many methods for finishing gear teeth are known in the art. Methods include but are not limited to gear hobbing and shaving, grinding, and honing.

In gear hobbing and shaving, a gear is rotated in mesh with a gear-like cutter tool. The gear-like tool has cutting edges that extend up and down the sides of the teeth parallel to the plane of rotation. This is accompanied by a relative traverse between the gear and the cutter in a plane parallel to the axis of the gear and the cutter. A surface roughness in the range of about 1.016 to about 2.032 micrometers (about 40 to about 80 microinches) Ra may typically be obtained with this method.

In gear grinding, the teeth are ground with a grinding tool. A surface roughness in the range of about 0.381 to about 0.889 micrometers (about 15 to about 35 microinches Ra may typically be obtained with this method.

In gear honing, the gear is rotated in mesh with a gear-shaped hone. Portions of the hone at the gear teeth are fabricated from a plastic material that is relatively hard yet highly resilient. The honing operation occurs by rotating the hone in mesh with the gear while providing a traverse stroke parallel to the axis of the gear. This distributes the finishing action evenly throughout each gear tooth. A surface roughness of about 1.016 to about 2.032 micrometers (about 15 to about 35 microinches) Ra may typically be obtained with this method. Fine grit honing may yield a surface roughness as low as about 0.305 to 0.33 micrometers (about 12 to 13 microinches) Ra.

A surface roughness of about 0.0762 micrometers/3 microinches Ra or less can be obtained by any suitable surface-texture technique, such as but not limited to, superfinishing (i.e., chemically accelerated vibratory polishing), etching, chemical polishing, electropolishing, mechanical polishing, honing, and vibratory finishing without chemical enhancement. In some embodiments, chemical and physiochemical methods may be utilized to obtain a surface roughness of about 0.0762 micrometers/3 microinches Ra or less. Polishing compounds used for preparing metal parts for electroplating are useful, e.g., liquid polishing compounds containing fine abrasive particulates.

One suitable superfinishing technique is described in U.S. Pat. No. 4,491,500, which discloses a process for refining metal surfaces in which a two-step process employing a liquid chemical is followed by a burnishing liquid. A relatively soft coating is formed, which is subsequently treated and physically removed. In the technique, a mass of elements, comprised of a quantity of objects with hard metal surfaces of arithmetic average roughness value in excess of about 15, is introduced into the container of mass finishing equipment. The mass of elements is wetted with a liquid substance capable of rapid reaction, under oxidizing conditions, to chemically convert the metal of the object surfaces to a stable film of substantially reduced hardness, and the mass is rapidly agitated, while maintaining the metal surfaces in a wetted condition with the liquid substance, to produce relative movement and abrasive contact among the elements thereof and to produce continuous oxygenation of the liquid substance. The reactivity of the liquid substance and the intensity of agitation of the mass are controlled to maintain the stable film on the metal surfaces at least at the level of visual perceptibility. Agitation is continued for a period sufficient to produce a finish of arithmetic average roughness less than about 14, and preferably less than about 10; thereafter, the objects will generally be treated to dissolve the stable film from the metal surfaces. In the preferred embodiments of the technique, the mass of elements introduced into the mass finishing equipment will include a quantity of abrasive finishing media, and the agitation step will be carried out for a period of less than six hours. Generally, the surfaces will be of a metal selected from the group consisting of iron, copper, zinc, aluminum, titanium, and the alloys thereof, and the stable film will comprise an oxide, phosphate, oxalate, sulfate, and/or chromate of the substrate metal. Thus, the liquid substance utilized to chemically convert the metal of the object surfaces will usually be a solution containing one or more of the radicals: phosphate, oxalate, sulfate, chromate, and mixtures thereof, and in certain instances it will be preferred for the substance to additionally include an oxidizing agent; generally, the liquid substance will have an acidic pH value. Solutions containing phosphate and oxalate radicals in combination with a peroxide compound are often found to be particularly effective for refining ferrous metal surfaces, and may be produced from a tripolyphosphate salt, oxalic acid, and hydrogen peroxide.

Another suitable superfinishing technique is described in U.S. Pat. No. 4,818,333, which discloses a process that uses a treatment composition having a high density burnishing media. In the technique, a mass of elements, including a quantity of objects having relatively rough metal surfaces, and a solution capable of converting the surfaces to a softer form, are introduced into the container of a mass finishing unit and are rapidly agitated therein to produce relative movement among the elements and to maintain the surfaces in a wetted condition with the solution, for conversion of any exposed metal, on a continuous basis. A quantity of relatively nonabrasive solid media elements are included, the amount and size of which are such that, under the conditions of agitation, relative sliding movement is promoted among them and with respect to the objects. The media elements are comprised of a mixture of oxide grains, fused to a coherent mass and substantially free of discrete abrasive particles, the coherent mass containing, on an oxygen-free basis, about 60 to 80 weight percent aluminum and about 5 to 30 weight silicon. They will have a density of at least about 2.75 grams per cubic centimeter (g/cc) and preferably an average diamond pyramid hardness (DPH) value of at least about 845; taken in quantity, the media elements will have a bulk density of at least about 1.70 grams per cubic centimeter.

U.S. Pat. Nos. 4,491,500 and 4,818,333 are incorporated herein by reference in their entirety. Other useful methods are those known in the electroplating art for obtaining smooth surfaces, such as etching and bright dipping.

Gears useful in the present invention can take various forms, e.g., a spur gear, an internal gear, a helical gear, a herringbone gear, a bevel gear, a worm gear, or a planetary gear, etc.

The following is an example of the present invention.

Example

The performance of a spur-gear sets in accordance with the present invention was compared to two comparative spur-gear sets that were not surface treated to a smooth finish.

All three sets of spur gears were composed of Pyrowear alloy 53, an alloy that is produced and supplied by Carpenter Technology Corporation. As-ground gears were obtained by grinding. As-ground gears exhibited a lambda ($\lambda$) of ~0.3. Intermediate gears were obtained by isotropic superfinishing (ISF) the as-ground gears to an intermediate roughness value between those of the as-ground and final superfinished conditions. This was accomplished by subjecting the as-ground gears to a lesser ISF processing duration. The finished gears were obtained by ISF processing the as-ground gears for a greater duration, resulting in the surface roughness value presented in the Table. The finished gears exhibited a lambda ($\lambda$) of ~1.5.

The three sets of spur gears were tested by assembling a pair of 4-inch test spur gears, composed of the surface-carburizing alloy, Pyrowear alloy 53, into a test rig. The test rig intermeshed the gear pair and applied a torque between the meshing gears that produced the surface contact stresses shown in the Table. The rotational speed was about 3500 revolutions per minute (rpm). The lubricant was 5 cSt polyol ester (POE) conforming to MIL-L-23699 or DoD-PRF-85734 specifications. Oil film thickness on the gears was ~6 microinches. The results of these tests are set forth in the Table.

TABLE

| Surface Condition | Surface Roughness, Ra ($\mu$in/$\mu$m) | Contact Stress (Ksi) | Power Increase Factor | Surface Life $N_p$ (M) | Life Increase Factor | Surface Design Allowable (Ksi) | Pitting-Allowable Improvement Factor | | Scoring-Allowable Improvement Factor | |
|---|---|---|---|---|---|---|---|---|---|---|
| | | | | | | | Stress | Power | Stress | Power |
| As-Ground* | 16/0.406 | 235 | 1.00 | 16.6 | 1.0 | 186 | 1.00 | 1.00 | 1.00 | 1.00 |
| Intermediate Roughness* | 8/0.203 | 263 | 1.25 | 24.2 | 1.5 | 212 | 1.14 | 1.30 | 1.08 | 1.18 |
| ISF - Processed (Finished) | 2/0.0508 | 263 | 1.25 | >61.9 | >3.7 | 229 | 1.23 | 1.52 | 1.40 | 1.95 |
| | | 280 | 1.42 | 37.6 | 2.3 | | | | | |

The finished gears (e.g. the gears finished to a surface roughness of less than about 0.0508 micrometers/3 microinches Ra via the techniques described herein) exhibited significantly longer surface life, and, concomitantly, greater life-increase factor, than the as-ground gears and the intermediate roughness gears. The finished gears of this invention contributed to a power density increase for pitting failures of about 52%. Moreover, the finished gears produced about a 95% increase in power-density for failure by scoring (scuffing).

It should be understood that the foregoing description is only illustrative of the present invention. Various alternatives and modifications can be devised by those skilled in the art without departing from the invention. Accordingly, the present invention is intended to embrace all such alternatives, modifications and variances that fall within the scope of the appended claims.

What is claimed is:

1. A gear set, comprising:
    a first gear having a first surface; and
    an intermeshing second gear having a second surface,
    wherein the first and second surfaces each, independently, have an arithmetic mean roughness of about 0.0762 micrometers/3 microinches or less, the first surface and the second surface are lubricated with a polyol ester lubricant and the first and second surfaces each have a lambda value of 1.0 to 2.0, the first gear and the second gear having a power density increase for pitting failure of about 52% versus as-ground gears having an as-ground lambda value of about 0.3.

2. The gear set of claim 1, wherein the power density increase for pitting failure is at a rotational speed of about 3500 rpm, a viscosity 5 cSt of the polyol ester lubricant and an film thickness of about 6 microinches.

3. The gear set of claim 1, wherein the first gear and the second gear have a power density for failure by scoring increase of about 95% versus the as-ground gears.

4. The gear set of claim 1, wherein the first gear and the second gear have a life increase factor versus the as-ground gears of 2.3 at a stress of 280 ksi.

5. The gear set of claim 1, wherein the first gear and the second gear have a life increase factor versus the as-ground gears of greater than 3.7 at a stress of 263 ksi.

6. The gear set of claim 1, wherein the lambda value is about 1.5.

7. The gear set of claim 1, wherein the first gear and the second gear each have a composition, by weight, 0.1% carbon, 0.35% manganese, 1.0% silicon, 1.0% chromium, 2.0% nickel, 3.25% molybdenum, 0.1% vanadium, 2.0% copper and a balance of iron.

* * * * *